United States Patent [19]

Chadwick et al.

[11] Patent Number: 4,736,199

[45] Date of Patent: Apr. 5, 1988

[54] METHOD OF SELECTIVELY DISPLAYING DATA

[75] Inventors: Victor J. Chadwick, Dorset; Ronald W. Barnes, Somerset, both of England

[73] Assignee: Plessey Overseas Limited, Ilford, England

[21] Appl. No.: 786,020

[22] Filed: Oct. 10, 1985

[30] Foreign Application Priority Data

Oct. 10, 1984 [GB] United Kingdom ............... 84 25565

[51] Int. Cl.$^4$ .............................................. G09G 1/16
[52] U.S. Cl. .................... 340/728; 340/721; 340/722
[58] Field of Search ............... 340/728, 726, 707, 711, 340/712, 722, 705, 721, 723, 724

[56] References Cited

U.S. PATENT DOCUMENTS 3,757,037  9/1973  Bialek ................... 340/712
4,307,393 12/1981  Hamada et al. ........ 340/728
4,308,532 12/1981  Murphy ................. 340/728
4,396,977  8/1983  Slater et al. ........... 340/722
4,586,035  4/1986  Baker et al. ........... 340/712

FOREIGN PATENT DOCUMENTS 0008931 1/1979 Japan .................. 340/728
0088533 7/1981 Japan .................. 340/728

Primary Examiner—Marshall M. Curtis
Assistant Examiner—Mahmoud Fatahi-Yar
Attorney, Agent, or Firm—Michael F. Oglo; Julian C. Renfro

[57] ABSTRACT

A method of selectively displaying data, whereby the data is arranged in a consecutive series of data-blocks, each data-block being a matrix of information such as a Lofargram. The method comprises selecting an initial set of data-blocks from the series of data-blocks, wherein the initial set of data-blocks comprises an initial data-block and every following nth data-block in the series and then displaying this initial set. The method includes displaying different sets of data-blocks subsequent to the initial set. Each different set of data-blocks comprises an initial data-block, differing from the initial data-block of the preceeding set by an integer m, and every subsequent nth data-block in the series. The method further comprises, displaying a reference data-block adjacent to any one of the sets of data-blocks for comparing with any one of the data-blocks in the series.

8 Claims, 2 Drawing Sheets

METHOD OF SELECTIVELY DISPLAYING DATA

BACKGROUND OF THE INVENTION

This invention relates to a method of selectively displaying data, and in particular, to such method which facilitates detailed analysis of large quantities of data in real time whilst maintaining comprehensive coverage.

Known methods of analysing large quantities of data in real time are problematic because the more data there is to be analysed, the more difficult it is to maintain comprehensive coverage. For example, this difficulty is especially apparent in the case where it is desired to view a large number of graphical representations on a visual display unit (VDU), and each representation contains data relating to continuously changing events.

It is an aim of the present invention to provide a method of selectively displaying data which alleviates the above-mentioned problem thereby enabling detailed, real time analysis of large quantities of data whilst maintaining comprehensive coverage.

SUMMARY OF THE INVENTION

According to the present invention there is provided a method of selectively displaying data, the method comprising:

selecting an initial set of data-blocks from a series of data-blocks, wherein the initial set comprises every $n^{th}$ data-block in the series;

displaying the initial set of data-blocks;

displaying different sets of data-blocks subsequent to the initial set, wherein respective data-blocks of each different set other than the initial set is displaced from respective data-blocks of the preceding set by m data-blocks;

displaying a reference data-block adjacent to one of the data-blocks of the initial set or the different sets.

The method of selectively displaying the data may be conducted in real time, the data-blocks of the series being updated after predetermined time intervals according to new data received.

The operator may increase or decrease the number n in response to data observed in the displayed data-blocks thereby respectively increasing or decreasing data detail contained within each data-block displayed.

The selected initial set of data blocks are preferably displayed so that they lie in a column. The reference data-block may be positioned at the foot of the column. Further, the data-block above the reference data-block may abut the reference data-block so that there is no separation at the reference data-block/data-block boundary.

The reference data-block may be one of the data-blocks from the selected set or it may be a data-block taken from a library. A second column of a set of data-blocks may be displayed, preferably so that it lies parallel to the first column.

A second reference data-block is preferably displayed at the foot of the second column.

The set of data-blocks may be displayed on a visual display unit.

Each data-block of the series may be a Lofargram. A Lofargram is a graphical representation of frequency information as a function of time. In a Lofargram, the vertical axis represents time, the horizontal axis represents frequency and the z axis is modulated in intensity according to the amplitude of the frequency signal at a given point in time.

The Lofargrams may be derived from acoustic waves received by a beamformer. The Lofargrams are preferably so constructed that they contain components of information relating to neighbouring Lofargrams.

BRIEF DESCRIPTION OF THE DRAWINGS

The invention will now be further described by way of example with reference to the accompanying drawings, in which.

DESCRIPTION OF THE PREFERRED EMBODIMENT

An embodiment of the present invention, will now be described, in the case where data-blocks are derived from acoustic waves received by a beamforming apparatus, the data-blocks being in the form of Lofargrams.

Figure 1:
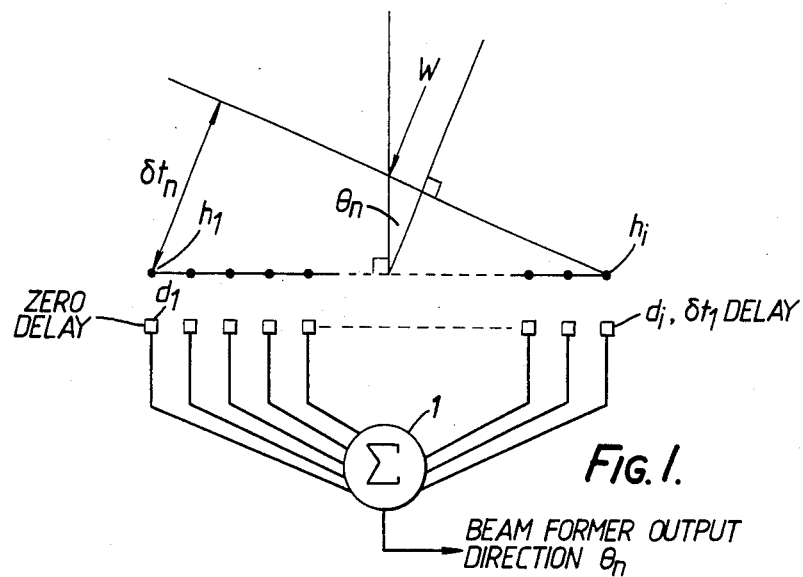
FIG. 1 is a schematic diagram of a beamformer which provides an output representative of an acoustic wave received from a distant source.

In FIG. 1, there is shown part of a beamformer, which part comprises an array of hydrophones $h_l$ to $h_i$ each of which generates an electrical signal when an acoustic wave is incident thereon. An acoustic wave front W, generated by a distant source (not shown) and having an angle of incidence on relative to the line of hydrophones $h_l$ to $h_i$ will inpinge on the hydrophones sequentially. For this angle of incidence, $\theta_n$, the acoustic wave W reaches the hydrophone $h_l$ at a time $\tau t_n$ later than the hydrophone $h_i$. Respective hydrophones $h_l$ to $h_i$ have respective delay means $d_l$ to $d_i$ associated therewith to delay the signals generated by each of the hydrophones $h_l$ to $h_i$, in response to an incident acoustic wave, so that the signals generated by the hydrophones are passed to a signal processing means 1 at the same time.

Th signal processing means 1 receives the signals from each of the delay means $d_l$ to $d_i$ to provide an output representative of the frequency spectrum of the acoustic wave W incident at the angle $\theta_n$ for a predetermined time duration t. In practice the beamformer will comprise a plurality of sets of delay means and signal processing means (not shown), one for each angle of incidence, so that the beamformer can produce frequency spectra for acoustic waves incident from a range of different angles.

Figure 2A:
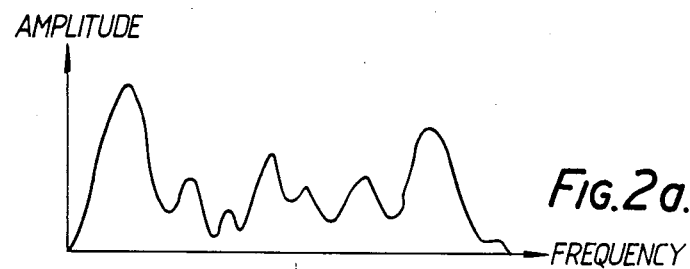
FIGS. 2a to 2c illustrate the construction of a Lofargram.
Figure 2B:
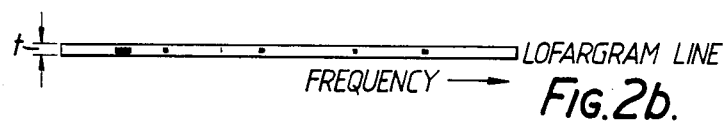
Figure 2C:
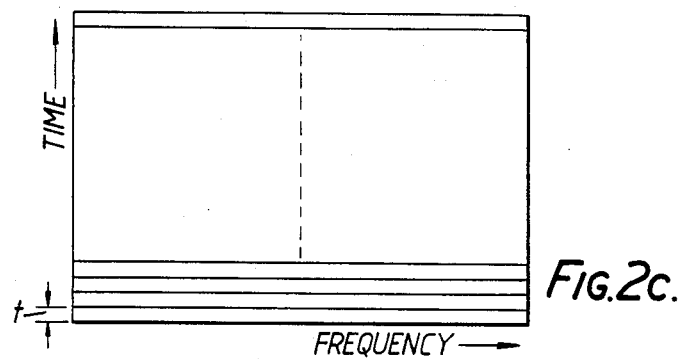

Referring now to FIGS. 2a to 2c, the formation of a Lofargram will be described. FIG. 2a shows a frequency spectrum of the beamformer output of FIG. 1 for the acoustic wave W. The frequency spectrum is translated down to a single line as shown in FIG. 2b. The frequency content of the acoustic wave W during a time t is represented by a line, the intensity of the line at a given point along its length being representative of the amplitude of the frequency at that point. The thickness of the line represents the time duration t.

FIG. 2c shows a Lofargram constructed by stacking successive lines of the general form depicted in FIG. 2b for a time period of, for example, 8 minutes for acoustic waves incident at the $\theta_n$.

A series of different Lofargrams are constructed in this way for acoustic waves arriving at different angles of incidence. Each one or a selection of Lofargrams from the series are displayed on a visual display unit (VDU). Further, each Lofargram is updated in real time as new data is received. Therefore, in the case where a beamformer receives acoustic waves over an angular range of 270° and a different Lofargram is produced in respect of acoustic waves incident at 5° intervals, a total of 54 Lofargrams (which are being continuously updated) are produced.

If an operator wishes to monitor data maintained within each Lofargram over the entire series, he has to display each of the 54 Lofargrams on a VDU. In order to accommodate this number of Lofargrams on a single VDU, it is necessary to reduce the detail contained within each Lofargram or to restrict coverage to particular areas of the available series.

Figure 3:
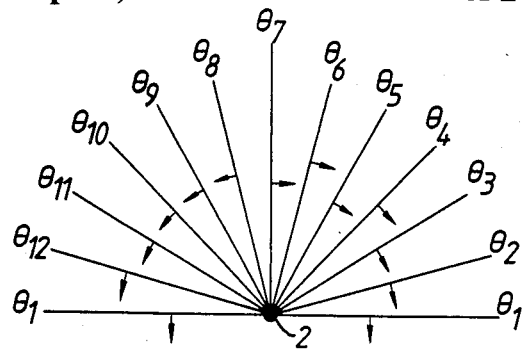
FIG. 3 is a diagram representing acoustic wavefronts, having angles of incidence $\theta_1$ to $\theta_{12}$, received by a beamformer having a 180° field of view.

FIG. 3 represents a beamformer 2 which receives and produces outputs in respect of acoustic waves incident at 12 different angles ($\theta_1$ to $\theta_{12}$). In practice, the number of outputs may be much higher depending on the angular resolution required. Each of the outputs of the beamformer 2 gives rise to a different Lofargram or data-block $L_1$ to $L_{12}$ and each Lofargram is being updated in real time as new data is received.

Figure 4:
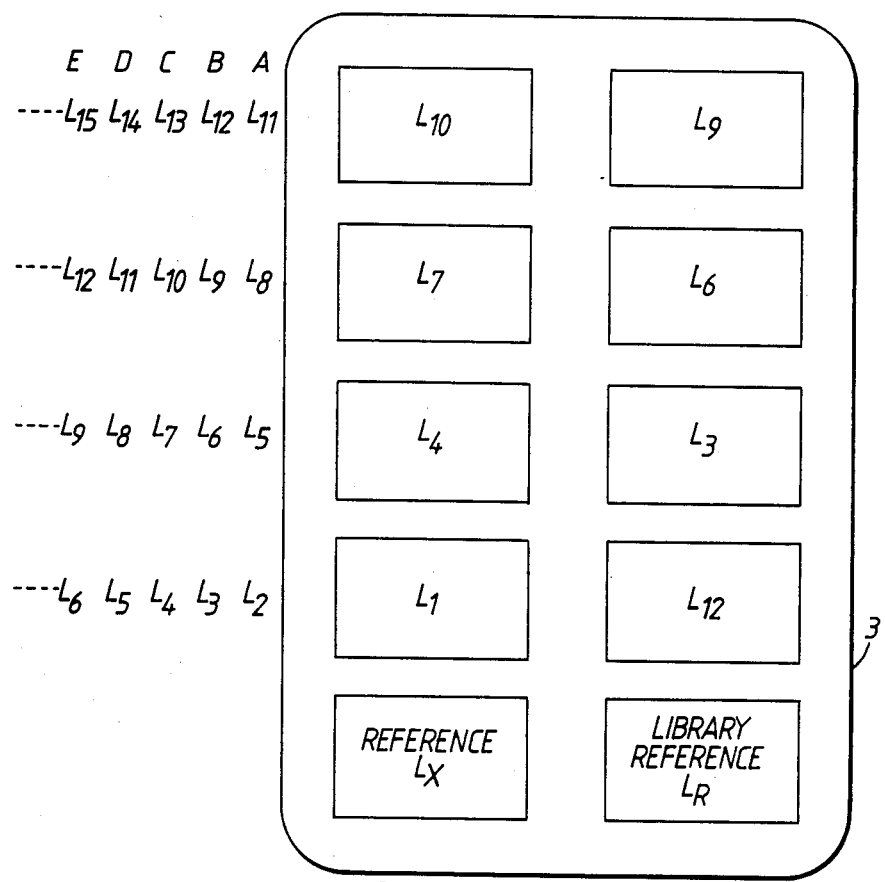
FIG. 4 shows two sets of Lofargrams displayed on a visual display unit.

A specific example of a method of analysing data according to the present invention will now be described with reference to FIG. 4. In FIG. 4 there is shown a visual display unit (VDU) 3 on which is displayed two columns of data-blocks, in this case Lofargrams $L_1$, $L_4$, $L_7$, $L_{10}$ and a reference Lofargram $L_x$ and $L_{12}$, $L_3$, $L_6$, $L_9$ and a library reference Lofargram $L_R$. In this case, the set of Lofargrams of the first column have been selected from the series of possible Lofargrams $L_1$ to $L_{12}$ produced by the beamformer 2. The reference Lofargram $L_x$ is selected according to predetermined criteria by an operator, and it is displayed at the foot of the first column. The reference Lofargram $L_x$ is then used to compare data contained therein with that of any one of the other Lofargrams of the first column. It can be seen from FIGS. 3 and 4 that in this case, every $n^{th}$ Lofargram (where n=3) has been selected from the series, and this set constitutes an initial set of data-blocks.

The operator is able to display any number of Lofargrams from the series in the first column. For example he may decide that it is acceptable to reduce the data detail within each Lofargram and to increase the number of Lofargrams displayed on the VDU to, say, 6. In this case, a greater overall view of the available data is achieved at the expense of detail relating to particular Lofargrams.

In order to view Lofargrams not displayed on the VDU, the operator can displace the Lofargrams by incrementing or decrementing Lofargrams of the displayed initial set so that a different set of Lofargrams is displayed. The Lofargrams within each set can be displaced from those of a preceding set by a number m of Lofargrams chosen by the operator. For example, in the case illustrated in FIG. 4, a second set of Lofargrams may comprise the Lofargrams $L_2$, $L_5$, $L_8$ and $L_{11}$ of column A and a third set to be displayed (subsequent to the second set) may comprise the Lofargrams $L_3$, $L_6$, $L_9$, and $L_{12}$ of column B. Clearly, the number m in this case in equal to one.

If, while viewing the initial set of Lofargrams, the operator sees an event in Lofargram $L_4$ which resembles that of data displayed in the reference Lofargram $L_x$, the operator can increment or decrement the displayed set of Lofargrams in the manner described. In this case, a fourth set of Lofargrams (see column C of FIG. 4) can be displayed which will result in the Lofargram $L_4$ appearing immediately above the reference Lofargram $L_x$. Hence, the operator can easily make a direct comparison between the two Lofargrams $L_4$ and $L_x$. If, however, the operator wishes directly to compare neighbouring Lofargrams $L_3$ and $L_5$ with the reference Lofargram $L_x$ (in case these Lofargrams contain information more closely resembling that of the reference Lofargram $L_x$ than that found in Lofargram $L_4$), he will be able to do so simply by incrementing or decrementing the displayed set in the manner described.

By analysing data in this way, the operator is able to have a comprehensive view of the whole of the series of Lofargrams $L_1$ to $L_{12}$ while still being able systematically and quickly to refer to Lofargrams not being displayed at a particular instant.

If the operator wishes to increase (or decrease) the data detail displayed in a particular Lofargram, he can decrease (or increase) the number n so as to increase or decrease the number of Lofargrams displayed in the set. For example, if the operator decides, as result of a comparison made with the refrence Lofargram $L_x$, to expand the Lofargram $L_4$ to obtain a higher resolution, he can display only $L_x$ and $L_4$ on the VDU 3, thereby enabling the scale of the Lofargram $L_4$ to be expanded to take up more space on the VDU 3. Although the Lofargrams of the first column may be displayed so as to take up the entire width of the VDU 3, FIG. 4 shows a second column of Lofargrams displayed on the VDU 3. The second column is optional and is displayed if, for example, the operator wishes to compare a set of Lofargrams with a reference Lofargram $L_R$ taken from a library.

A particular advantage of the method of selectively displaying data in the example described above is that since each Lofargram is formed from a frequency spectrum which is derived from incident acoustic waves by frequency analysis techniques, then any given Lofargram will contain components of data relating to neighbouring Lofargrams. Therefore, if an event of interest to the operator is represented in a Lofargram which is not in a displayed set, then the operator may still be able to detect the presence of that event in a neighbouring Lofargram which is being displayed, albeit at a lower intensity. When detecting such an event, the operator can estimate which neighbouring Lofargram may contain more information relating to that event and he can then increment or decrement the displayed set of Lofargrams accordingly.

Selectively displaying data according to the method of the present invention is also particularly advantageous in the case where the data-blocks are being updated in real time as new data is received, since the operator can continuously scan through the series of data-blocks, make comparisons with a reference data-block, and focus on blocks which he believes will contain more detailed information of a potentially interesting event.

Although the method according to the present invention as described above relates to Lofargrams, the invention is not limited to the analysis of such. It is also envisaged that data received from, for example, geological surveying apparatus or medical scanning apparatus could also be selectively displayed in this way.

We claim:

1. A method of selectively displaying data, whereby the data is arranged in a consecutive series of data-blocks, each data-block being a matrix of information, the method comprising:
   (a) selecting an initial set of data-blocks from the series of data-blocks, wherein the initial set comprises an initial data-block and very following nth data-block in the series, where n is an integer;
   (b) displaying the initial set of data-blocks;
   (c) displaying different sets of data-blocks subsequent to the initial set, wherein each different set comprises an initial data-block, differing from the initial data-block of the preceeding set by an integer m, and every subsequent nth data-block in the series; and,
   (d) displaying a reference data-block adjacent to one of the data-blocks in the series, for comparing with any one of the data-blocks in the series.

2. A method according to claim 1, wherein the method is conducted in real time, the data-blocks of the series being updated according to new data received.

3. A method according to claim 2, wherein the number n can be inceased or decreased in response to data observed in the displayed data-blocks thereby respectively increasing or decreasing data detail contained within each data-block displayed.

4. A method according to claim 1, claim 2 or claim 3, wherein the selected initial set of data-blocks is displayed so that the data-blocks are arranged in a column, thereby defining a first column of data-blocks, and the reference data-block is displayed beneath the first column.

5. A method according to claim 4, wherein the reference data-block is one of the data-blocks from the selected initial set of data blocks.

6. A method according to claim 4, wherein each data-block of the series is a Lofargram.

7. A method according to claim 4, wherein the reference data-block is selected from a library of data-blocks, whereby the library comprises a series of data-blocks having been stored.

8. A method according to claim 7, wherein a second column of data-blocks is displayed parallel to the first column and a second reference data-block is selected from the library of data-blocks and displayed beneath the second column, for comparison with any one of the data-blocks in the second column.

* * * * *